United States Patent
Guerif et al.

(10) Patent No.: US 11,629,051 B2
(45) Date of Patent: *Apr. 18, 2023

(54) METHOD FOR INCREASING EFFICIENCY AND REDUCING EMISSIONS IN A STEAM REFORMING PLANT

(71) Applicant: L'Air Liquide, Société Anonyme pour l'Etude et l'Exploitation des Procédés Georges Claude, Paris (FR)

(72) Inventors: Pierre-Philippe Guerif, Houston, TX (US); Joseph T. Stroffolino, IV, Pearland, TX (US); Alain Guillard, Houston, TX (US)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/377,625

(22) Filed: Jul. 16, 2021

(65) Prior Publication Data
US 2023/0020425 A1    Jan. 19, 2023

(51) Int. Cl.
*C01B 3/48*    (2006.01)
*B01D 53/14*   (2006.01)
(Continued)

(52) U.S. Cl.
CPC .............. *C01B 3/48* (2013.01); *B01D 53/047* (2013.01); *B01D 53/1475* (2013.01); *B01D 53/229* (2013.01); *C01B 3/501* (2013.01); *C01B 3/52* (2013.01); *C01B 3/56* (2013.01); *B01D 2257/504* (2013.01); *C01B 2203/0205* (2013.01); *C01B 2203/0283* (2013.01); *C01B 2203/042* (2013.01);
(Continued)

(58) Field of Classification Search
CPC .. C01B 3/48; C01B 3/501; C01B 3/52; C01B 3/56; C01B 2203/0233; C01B 2203/0283; C01B 2203/0405; C01B 2203/0415; C01B 2203/042; C01B 2203/0475; C01B 2203/1241; B01D 53/047; B01D 53/1475; B01D 53/229; B01D 2257/504
See application file for complete search history.

(56) References Cited

U.S. PATENT DOCUMENTS

2015/0323248 A1* 11/2015 Terrien .................. F25J 3/0223
                                                      62/619

* cited by examiner

*Primary Examiner* — Jafar F Parsa
(74) *Attorney, Agent, or Firm* — Elwood L. Haynes

(57) ABSTRACT

A method for decreasing the SFFC of a steam reforming plant, including establishing a base operating mode. Then modifying the base operating mode by introducing the shift gas stream into a solvent based, non-cryogenic separator prior to introduction into the pressure swing adsorption and introducing the compressed hydrogen depleted off-gas stream in a membrane separation unit, wherein the membrane is configured to produce the hydrogen enriched permeate stream at a suitable pressure to allow the hydrogen enriched permeate stream to be combined with carbon dioxide lean shift gas stream, prior to introduction into the pressure swing adsorption unit without requiring additional compression. Thereby establishing a modified operating mode. Wherein said pressure swing adsorption unit has a modified overall hydrogen recovery. Wherein said modified operating mode has a modified hydrogen production, a modified hydrogen production unit firing duty, a modified SCO2e, and a modified SFFC.

19 Claims, 1 Drawing Sheet

(51) Int. Cl.
*B01D 53/22* (2006.01)
*C01B 3/56* (2006.01)
*C01B 3/52* (2006.01)
*C01B 3/50* (2006.01)
*B01D 53/047* (2006.01)

(52) U.S. Cl.
CPC ................. *C01B 2203/0405* (2013.01); *C01B 2203/0415* (2013.01); *C01B 2203/0475* (2013.01); *C01B 2203/1241* (2013.01)

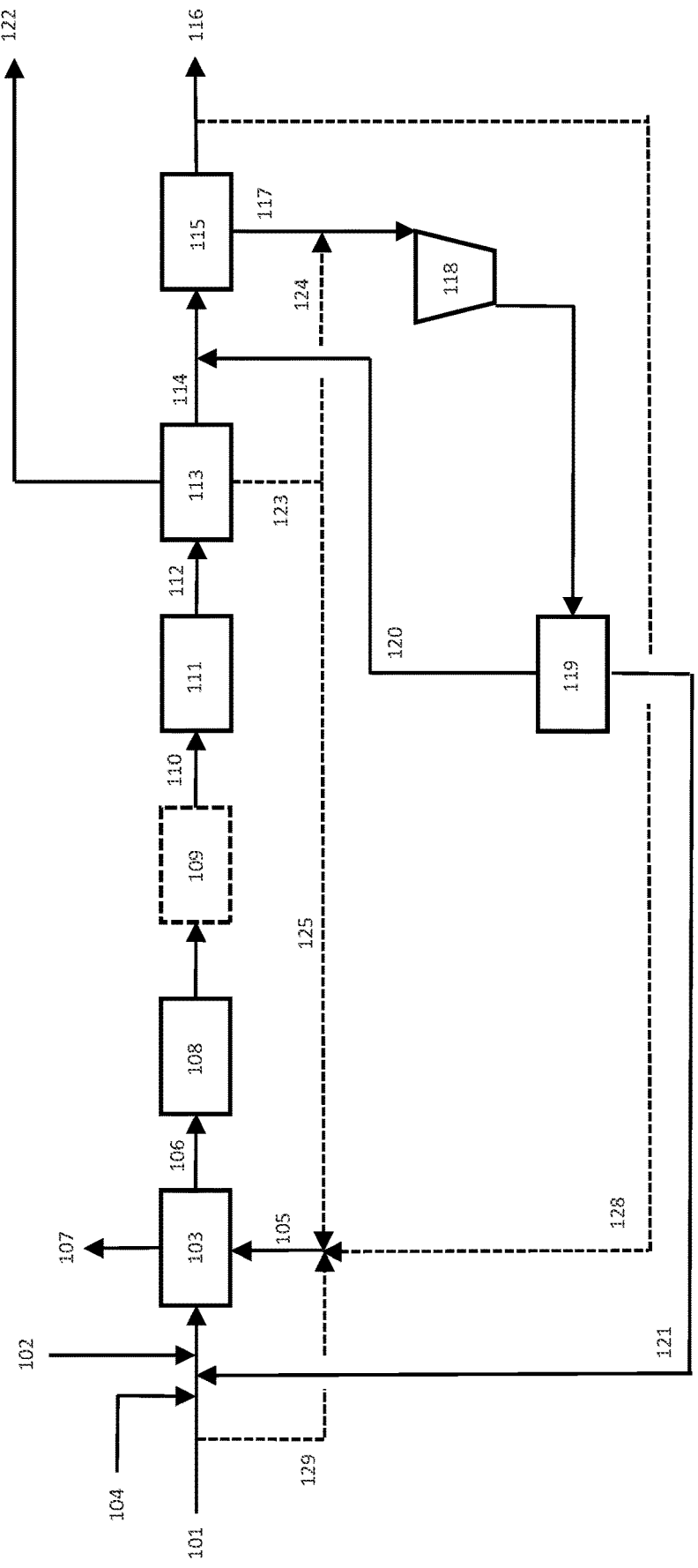

METHOD FOR INCREASING EFFICIENCY AND REDUCING EMISSIONS IN A STEAM REFORMING PLANT

BACKGROUND

In hydrogen plant design and operation, a primary objective is to minimize specific feed and fuel consumption (SFFC), defined herein as BTU of feedstock and fuel per standard cubic foot of hydrogen. Other than selection of the appropriate syngas generating technology and related process parameters, there are two other primary steps which minimize SFFC and therefore maximize hydrogen yield: the water gas shift step and the pressure swing adsorption step.

A secondary objective may be to reduce carbon dioxide emissions of the hydrogen plant on a specific basis, SCO2e, defined herein as tons of CO2 emitted per standard cubic foot of hydrogen produced. As a rule of thumb, 55-65% of the CO2 emitted is generated in the syngas generation step and water gas shift step(s), where the balance is generated by combustion of hydrocarbon fuels to provide heat for the syngas generation step. It is known generally in the prior art that CO2 capture is less expensive on a syngas stream than on a flue gas stream, which is not considered in this filing. It is also known generally in the prior art that solvent based non cryogenic CO2 removal units such as amine-based technologies or Rectisol™ are the industrial standard for treating such streams.

The water gas shift step maximizes hydrogen yield by converting carbon monoxide, produced in the syngas generation step, and water, to additional hydrogen and carbon dioxide. There are different types of water gas shift reactors, whereas the "high temperature" water gas shift is most commonly used in hydrogen plants.

Further conversion of carbon monoxide to hydrogen can occur when a "high temperature" water gas shift is preceding a "low temperature" water gas shift. This is more commonly used in ammonia plants, where it is required that the carbon monoxide is reduced as low as possible. A byproduct of any water gas shift step is carbon dioxide, in addition to the amount produced in the syngas generation step.

The Pressure Swing Adsorption (PSA) step follows water gas shift and is responsible for separating as much produced hydrogen out of the syngas stream as possible. The typical recovery in a syngas plant is 80-90% of the hydrogen, which means at least 10-20% of hydrogen produced is not recovered. The non-recovered hydrogen, as well as any non-hydrogen components, comprise the PSA offgas, which is most commonly used as fuel in the Plant. The main component of the PSA offgas is carbon dioxide (usually 40-50 mol %), followed by any lost hydrogen, and other components like residual carbon monoxide, methane, nitrogen, and water.

SUMMARY

A method for decreasing the SFFC and SCO2e and increasing the SCO2c of a steam reforming plant, including establishing a base operating mode. Then modifying the base operating mode by introducing the shift gas stream into a solvent based, non-cryogenic separator prior to introduction into the pressure swing adsorption unit, thereby producing a saturated carbon dioxide stream, and a carbon dioxide lean shift gas stream, combining the carbon dioxide lean shift gas stream with a hydrogen enriched permeate stream and introducing the combined gas stream into the pressure swing adsorption unit, thereby producing a modified hydrogen product stream, which contains not more than 90% of the total hydrogen produced by the syngas generation and water gas shift steps, and a hydrogen depleted off-gas stream, which contains not less than 10% of the total hydrogen contained within the shift gas stream, wherein the hydrogen depleted off-gas stream is compressed to a pressure greater than 25 psi greater than the hydrocarbon stream pressure, and introducing the compressed hydrogen depleted off-gas stream in a membrane separation unit, thereby producing a hydrogen enriched permeate stream and a hydrogen depleted retentate stream, wherein the membrane is configured to produce the hydrogen enriched permeate stream at a suitable pressure to allow the hydrogen enriched permeate stream to be combined with carbon dioxide lean shift gas stream, prior to introduction into the pressure swing adsorption unit without requiring additional compression, and wherein the hydrogen depleted retentate stream is combined with the hydrocarbon stream prior to admission into the steam methane reformer as the process feed stream. Thereby establishing a modified operating mode. Wherein said pressure swing adsorption unit has a modified overall hydrogen recovery. Wherein said modified operating mode has a modified hydrogen production, a modified hydrogen production unit firing duty, a modified SCO2e, and a modified SFFC. Wherein the modified SCO2e is at least 7% less than the base SCO2e. Wherein the modified SCO2c is at least 12% greater than the base SCO2c.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein:

FIG. 1 is a schematic representation in accordance with one embodiment of the present invention.

ELEMENT NUMBERS

101=process feed stream
102=high pressure steam stream
103=hydrogen production unit
104=hydrocarbon stream
105=fuel gas stream
106=raw syngas stream
107=flue gas stream
108=high temperature water-gas shift converter
109=low temperature water-gas shift converter
110=shifted syngas stream
111=syngas cooler
112=cooled, shifted syngas stream
113=solvent based, non-cryogenic separator
114=carbon dioxide depleted shift gas stream
115=pressure swing adsorption unit
116=hydrogen product stream
117=off-gas stream
118=off-gas stream compressor
119=membrane separation unit
120=hydrogen rich permeate stream
121=hydrogen depleted retentate stream
122=saturated carbon dioxide stream
123=flash gas stream
124=first fraction (of flash gas stream)
125=second fraction (of flash gas stream)
128=segment (of hydrogen product stream)
129=portion (of process feed stream)

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Described herein are methods for decreasing the specific feed and fuel consumption (SFFC) (BTU HHV of feed and fuel per standard cubic foot of hydrogen) and/or decreasing specific CO2 emissions (SCO2e) (as defined as tons of CO2 emitted per standard cubic feet of hydrogen produced) and/or increasing specific CO2 capture (SCO2c) (as defined as tons of CO2 captured per standard cubic feet of hydrogen produced) in a new or existing hydrogen plant. These methods include compression of the pressure swing adsorption off-gas which contains hydrogen not recovered by any other process unit, processing of the compressed off-gas by a membrane unit, recycling without additional compression of the hydrogen rich stream from the membrane unit to the inlet of the pressure swing adsorption unit for further hydrogen purification, and recycling without additional compression of the hydrogen depleted stream from the membrane as a feed of the syngas generation unit.

A so-called "base operating mode" may be defined as introducing a process a process feed stream into a hydrogen production unit and thus produce a raw syngas stream. This raw syngas stream is the introduced into a high temperature water gas shift converter, thus producing a shifted syngas steam. This shifted syngas stream may then be introduced into a pressure swing adsorption unit which produces a product hydrogen stream. This "base operating mode" will have a base overall hydrogen recovery, a base hydrogen production, a base hydrogen production unit firing duty, a base SCO1e, a base SCO2c, and a base SFFC against which the following improvements will be gauged.

Turning to the sole FIGURE, process feed stream 101 is combined with high-pressure steam stream 102 and introduced into hydrogen production unit 103. In one embodiment, process feed stream may be combined with hydrocarbon stream 104, which may consist of hydrocarbons of C2 and higher. Hydrocarbon stream 104 may include, but not be limited to, ethane, propane, butanes, or naphtha. Introduction of these higher hydrocarbons would tend to maximize SCO2c from the syngas and optimize CO2 capture costs and revenues.

Hydrogen production unit 103 is preferably a steam methane reformer, which may be combined with a waste heat boiler (not shown). Fuel gas stream 105 is also introduced into hydrogen production unit 103, which thus produces raw syngas stream 106 and flue gas stream 107. Raw syngas stream 106 is then introduced into high temperature water gas shift reactor 108, and optionally then into low temperature water gas shift reactor 109, thus producing shifted syngas steam 110. Within high temperature water gas shift reactor 108 and/or low temperature water gas shift reactor 109, carbon monoxide and steam are catalytically converted into carbon dioxide and hydrogen. Shifted syngas stream 110 is then introduced into syngas cooler 111, which produces cooled, shifted syngas stream 112.

Cooled, shifted syngas stream 112 is then introduced into solvent based non-cryogenic separator 113, wherein at least a fraction of the CO2 present is removed prior to admission into pressure swing adsorption unit 115. In one embodiment, solvent based non-cryogenic separator 113 is an amine unit. This is the most economical location from which to recover CO2. An alternate, but more expensive option being removal of CO2 from the furnace flue gas, which is not considered herein. Solvent based non-cryogenic separator 113 produces saturated CO2 stream 122 and shift gas stream 114 that is largely depleted of CO2. Saturated CO2 stream 122 may be captured and utilized for some downstream purpose. As saturated CO2 stream 127 is purposed as to not be emitted to the atmosphere, the SCO2e is reduced by not less than 50% compared to the "base operating mode", but preferably by not less than 60%.

Solvent based non cryogenic separator 113 may also have a flash step, thereby producing flash gas stream 123. Flash gas stream 123 may have a pressure of not more than 200 psig, and preferably not more than 30 psig. Flash gas stream 123 may contain CO2, hydrogen, carbon monoxide, and methane. At least a first fraction 124 of flash gas stream 123 may be combined with off-gas stream 117, prior to admission into off-gas stream compressor 118. Combining first fraction 124 with off-gas stream 117 thereby decreases SCO2e by not less than 15% when compared to the prior art. Combining first fraction 124 with off-gas stream 117 thereby increases SCO2c by not less than 20% compared to the prior art. A second fraction 125 of flash gas stream 123 may be combined with a segment 128 of hydrogen product stream 116, and/or a portion 129 of process feed stream 101, prior to admission into hydrogen product ion unit 103 as a combined fuel stream.

Shift gas stream 114 may be combined with hydrogen rich permeate stream 120 (below), and the combined stream is introduced into pressure swing adsorption unit 115. Pressure swing adsorption unit 115 produces hydrogen product stream 116 and off-gas stream 117. The recycling of hydrogen rich (i.e. CO2 depleted) permeate stream 120 this way, provides a steady state operation of the iterative system that yields an overall hydrogen recovery for pressure swing adsorption unit 115 of not less than 98 mol %, and preferably not less than 99 mol %, an increase of not less than 10 base points compared to the "base operating mode" or a new plant designed without the instant invention.

Thus, any CO2 that may have been present in the feed stream to pressure swing adsorption unit 115 in the absence of solvent based non-cryogenic separator 113 is now largely absent from the PSA unit off-gas. Off-gas stream 117 is now mostly hydrogen (typically up to 65%). The lack of CO2 in off-gas stream 117 stream allows it to be economically compressed for additional hydrogen recovery. Hydrogen product stream 116 may contain less than 90% of the total hydrogen produce by hydrogen production unit 103, high temperature water gas shift reactor 108, and (if present) low temperature water gas shift reactor 109. Conversely, off-gas stream 117 contains at least 10% of the total hydrogen produce by hydrogen production unit 103, high temperature water gas shift reactor 108, and (if present) low temperature water gas shift reactor 109.

Off-gas stream 117 is then introduced into off-gas stream compressor 118, wherein it is compressed and sent to membrane separation unit 119. Off-gas stream compressor 118 may compress off-gas stream 117 to not less than 25 psi less than the pressure of hydrocarbon stream 104. Membrane separation unit 119 separates at least 50%, but preferably at least 70%, of the hydrogen in off-gas stream 117 from the other components (CO, CO2 (trace), CH4, N2, H2O). The resulting hydrogen rich permeate stream 120 comprises up to 98 mol % H2. Membrane separation unit 119 is designed in such a way that hydrogen rich permeate stream 120 is of suitable pressure to be recycled back to the inlet pressure swing adsorption unit 115 in order to further purify up to 99.9 mol % H2, without further compression.

The net effect is an overall recovery of up to 99 mol % of the hydrogen produced, a 11-23% increase depending on the baseline PSA performance. This reduces the plant's SFFC. Membrane separation unit 119 may recover not less than 50 mol % of the hydrogen contained in the off-gas stream 117, and preferably not less than 70 mol %. Membrane permeate stream 120 may have not less than 50 mol % hydrogen purity, and preferably not less than 70 mol %. Residual hydrogen depleted retentate stream 121 is mostly CO, CH4, and CO2 with some amount of N2 and water. Some unseparated H2 remains in the hydrogen depleted retentate stream 121. Hydrogen depleted retentate stream 121 may be combined with process feed stream 101.

In one embodiment, this system may be added to existing plants. Existing plants which recover the additional hydrogen can also produce the same amount of hydrogen product as previously, but at a reduced reformer load, decreasing both SFFC and SCO2e depending on the configuration. The concept is suitable for existing plants which want to make additional hydrogen (i.e. "H2 boost"), or for new plants where the syngas generation step could be reduced in size and cost due to the increased hydrogen recovery downstream.

In another embodiment, the additional hydrogen recovered may be used as a fuel to decarbonize the fuel system. In this case, the plant may run at full firing duty, and burn the hydrogen produced above original design. Utilization of this additional hydrogen recovery allows for the same hydrogen production in an existing plant for a decreased firing duty, thereby decreasing SFFC by not less than 2% compared to "base operating mode", preferably by not less than 3%.

In another embodiment, the additional hydrogen recovery may allow for a higher hydrogen production, for the same firing duty, not less than 10% more, preferably by not less than 15% more compared to prior art. The additional hydrogen recovery may allow for a smaller and cheaper syngas generation step with a lower firing duty in a new plant, for the same desired hydrogen production, compared to prior art.

In another embodiment, the additional hydrogen recovery may allow for the same hydrogen production in an existing plant at the same firing duty, allowing for some percentage of hydrogen product to be used as a carbon free fuel, thereby decreasing SCO2e by not less than 30% compared to the prior art, and increasing SCO2c by not less than 40% compared to the prior art.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for decreasing the SFFC and SCO2e and increasing the SCO2c of a steam reforming plant, comprising:
   a. introducing a hydrocarbon stream and a steam stream into a steam methane reformer, thereby producing a raw syngas stream, wherein the hydrocarbon stream has a hydrocarbon stream pressure,
   b. introducing the raw syngas stream into a high temperature water gas shift converter, thereby producing a shift gas stream, and
   c. introducing the shift gas stream into a pressure swing adsorption unit, thereby producing a hydrogen product stream thereby establishing a base operating mode,
   wherein said pressure swing adsorption unit has a base overall hydrogen recovery,
   wherein said base operating mode has a base hydrogen production, a base hydrogen production unit firing duty, a base SCO2e, a base SCO2c, and a base SFFC, the method further comprising:
   d. introducing the shift gas stream into a solvent based, non-cryogenic separator prior to introduction into the pressure swing adsorption unit, thereby producing a saturated carbon dioxide stream, and a carbon dioxide lean shift gas stream,
   e. combining the carbon dioxide lean shift gas stream with a hydrogen enriched permeate stream and introducing the combined gas stream into the pressure swing adsorption unit, thereby producing a modified hydrogen product stream, which contains not more than 90% of the total hydrogen produced by the syngas generation and water gas shift steps, and a hydrogen depleted off-gas stream, which contains not less than 10% of the total hydrogen contained within the shift gas stream, wherein the hydrogen depleted off-gas stream is compressed to a pressure greater than 25 psi greater than the hydrocarbon stream pressure,
   f. introducing the compressed hydrogen depleted off-gas stream in a membrane separation unit, thereby producing a hydrogen enriched permeate stream and a hydrogen depleted retentate stream, wherein the membrane is configured to produce the hydrogen enriched permeate stream at a suitable pressure to allow the hydrogen enriched permeate stream to be combined with carbon dioxide lean shift gas stream, prior to introduction into the pressure swing adsorption unit without requiring additional compression, and wherein the hydrogen depleted retentate stream is combined with the hydrocarbon stream prior to admission into the steam methane reformer as the process feed stream, thereby establishing a modified operating mode,
   wherein said pressure swing adsorption unit has a modified overall hydrogen recovery,
   wherein said modified operating mode has a modified hydrogen production, a modified hydrogen production unit firing duty, a modified SCO2e, and a modified SFFC
   wherein the modified SCO2e is at least 7% less than the base SCO2e,
   wherein the modified SCO2c is at least 12% greater than the base SCO2c.

2. The method of claim 1, wherein the modified overall hydrogen recovery for the pressure swing adsorption unit is not less than 98 mol % or an improvement of not less than 10 base points over the base overall hydrogen recovery.

3. The method of claim 2, wherein the modified overall hydrogen recovery for the pressure swing adsorption unit is not less than 99 mol %.

4. The method of claim 1, wherein the difference between the modified hydrogen production and the base hydrogen production comprises a delta hydrogen recovery,
wherein the difference between the modified hydrogen production unit firing duty and the base hydrogen production unit firing duty comprises a delta hydrogen production unit firing duty.

5. The method of claim 4, wherein the base hydrogen production may be achieved with the modified operating mode by reducing the base hydrogen production unit firing duty by the delta hydrogen production unit firing duty, thereby a modified SFFC that is not less than 1% lower than the base SFFC.

6. The method of claim 5, wherein the modified SFFC that is not less than 2% lower than the base SFFC.

7. The method of claim 1, wherein the syngas stream is introduced into a low temperature water gas shift reactor following the high temperature water gas shift reactor and prior to introduction to the solvent based, non-cryogenic separator, thereby reducing the off-gas stream carbon dioxide content and increasing the syngas carbon dioxide content.

8. The method of claim 7, wherein the solvent based non-cryogenic separator produces a flash gas at not more than 200 psig, containing CO2, hydrogen, carbon monoxide, and methane, which is combined with the hydrogen depleted off-gas stream, thereby producing a further modified SCO2e, wherein the further modified SCO2e is at least 8% less than the base SCO2e, and producing a modified SCO2c, wherein the modified SCO2c is at least 5% less than the base SCO2C.

9. The method of claim 8, wherein the flash gas has a pressure of not more than 30 psig.

10. The method of claim 7, wherein at least a portion of modified hydrogen product stream is combined with the hydrocarbon stream and introduced into the steam methane reformer as the fuel gas stream, thereby resulting in a further modified SCO2e, wherein the further modified SCO2e is at least 20% less than the base SCO2e, and producing a modified SCO2C, wherein the modified SCO2c is at least 20% greater than the base SCO2C.

11. The method of claim 7, wherein the hydrocarbon feedstock is more carbon rich than methane, thereby maximizing the SCO2c from syngas.

12. The method of claim 1, wherein the modified hydrogen production is achieved with the base hydrogen production unit firing duty, and wherein the modified hydrogen production is at least 10% greater than the base hydrogen production.

13. The method of claim 12, wherein the modified hydrogen production is at least 15% greater than the base hydrogen production.

14. The method of claim 1, wherein the membrane separation unit recovers more than 50 mol % of the hydrogen contained in the hydrogen depleted off-gas steam.

15. The method of claim 14, wherein the membrane unit recovers at least 70% of the hydrogen contained in the hydrogen depleted off-gas steam.

16. The method of claim 1, wherein the hydrogen enriched permeate stream at least 50 mol % hydrogen.

17. The method of claim 16, wherein the hydrogen enriched permeate stream is at least 70 mol % hydrogen purity.

18. The method of claim 1, wherein the modified SCO2e is at least 9% less than the base SCO2e.

19. The method of claim 1, wherein the modified SCO2c is at least 14% greater than the base SCO2c.

* * * * *